United States Patent
Chuang

(10) Patent No.: US 6,799,949 B2
(45) Date of Patent: Oct. 5, 2004

(54) PLASTIC HUB WITH AN AUTOMATICALLY ADJUSTED CORE

(75) Inventor: Wen-Hao Chuang, Kaohsiung (TW)

(73) Assignee: Enlo Technology Co., Ltd., Kaohsiung (TW)

(*) Notice: Subject to any disclaimer, the term of this patent is extended or adjusted under 35 U.S.C. 154(b) by 99 days.

(21) Appl. No.: 10/325,974

(22) Filed: Dec. 23, 2002

(65) Prior Publication Data

US 2004/0120824 A1 Jun. 24, 2004

(51) Int. Cl.⁷ ............................................. B63H 1/28
(52) U.S. Cl. .............................. 416/244 R; 416/246
(58) Field of Search ........................ 416/204 R, 205, 416/206, 219 R, 219 A, 228, 231 B, 244 R, 246

(56) References Cited

U.S. PATENT DOCUMENTS

| | | | | |
|---|---|---|---|---|
| 3,622,249 A | * | 11/1971 | Hayashi et al. | 416/204 R |
| 3,708,243 A | * | 1/1973 | Wooden | 416/134 R |
| 3,709,633 A | * | 1/1973 | Wooden | 416/134 R |
| 3,867,055 A | * | 2/1975 | Wooden | 403/373 |
| 5,655,884 A | * | 8/1997 | Rose | 416/240 |

* cited by examiner

Primary Examiner—Hoang Nguyen
(74) Attorney, Agent, or Firm—Birch, Stewart, Kolasch & Birch, LLP

(57) ABSTRACT

A plastic hub with an automatically adjusted core includes a hub main body and hub blades formed on the outer portion of the hub main body. The arch-shape cylinders formed at the ends of the hub blades are placed against the positioning rack of the plastic hub so that an effect of adjusting the position shift can be generated by the arch-shape surfaces, and the shift caused by the axle revolving can be adjusted by the hub blades as well as the hub core can be automatically adjusted.

5 Claims, 5 Drawing Sheets

PLASTIC HUB WITH AN AUTOMATICALLY ADJUSTED CORE

FIELD OF THE INVENTION

The invention relates to a plastic hub that its core can be automatically adjusted and, more particularly, to a plastic hub that is placed against its positioning rack, and through the arch-shape surfaces of the arch-shape cylinders formed at the end of the hub blades, an effect of adjusting the position shift is provided so that the shift generated by the revolving of the hub axle can be adjusted by the hub blades as well as the hub core can be automatically adjusted.

BACKGROUND OF THE INVENTION

Conventionally, an axle is put directly through a central hole in the middle of a fan when the axle is to be fixed into the fan. Because the axle is directly placed in without being aligned, it is liable to generate a position shift when the fan starts to work. Hence, a washer is added to the conventional fan axle to adjust its core. However, because such design needs to use oil-absorbing cotton, the cost of manufacturing will be increased and the process of assembling will become more complicated, which in turn will affect the lifespan of the fan.

SUMMARY OF THE INVENTION

Focusing on the above problems, an object of the invention is to utilize the arch-shape cylinders formed at the end of the hub blades, wherein the arch-shape cylinders are placed against their corresponding positioning racks, and through the arch-shape surfaces of the arch-shape cylinders, an effect of adjusting the position shift can be generated.

Another object of the invention is to provide the hub blades that are formed on the outer portion of the plastic hub and distributed like a ring around the hub, wherein the hub blades are placed against the ring-shape concaved slots so that when the axle core is shifted due to assembling, the shift can be adjusted by the hub blades as well as the hub core can be automatically adjusted.

From the above descriptions, the aspects of the inventions can be concluded as follows:

According to the first aspect of the invention, the plastic hub is placed against the positioning rack through the arch-shape cylinders that are located at the ends of the hub blades and have the arch-shape surfaces that provide the position adjusting effect.

According to the second aspect of the invention, the inner portion of the hub main body is a ball construction, which is put into an arch-shape concaved slot, whose shape is in accordance with the shape of the ball construction; the arch-shape concaved slot is located in the middle of the positioning rack to facilitate the hub being put into the positioning rack, and through the arch-shape cylinders located at the end of each hub blades that are distributed like a ring, the position shift generated by the revolving of the hub axle can be adjusted by the hub blades, and the hub core can be automatically adjusted.

According to the third aspect of the invention, because the hub blades are designed titled, the axle can be more supportive in positioning when it is put into the inside of the fan body, making the fan work more smoothly; meanwhile, the position shift generated by the revolving of the hub axle can be adjusted by the hub blades as well as the hub core can be automatically adjusted.

According to the fourth aspect of the invention, because the hub blades are designed titled, the axle has more flexibility when it is put into the inside of the fan body, which means it can absorb the shock and impact generated by the motor rotor to enhance the stability of operation as well as to prolong the lifespan of the fan.

According to the fifth aspect of the invention, because the hub blades are designed titled, the axle has more flexibility in supporting positioning, which means it can absorb the common difference generated by the component processing of the motor rotor and the hub cap so as to achieve easy assembly and to enhance the efficiency of assembly.

DESCRIPTION OF THE PREFERRED EMBODIMENTS

The detailed descriptions and technical contents of the invention will be described in the embodiment below with reference to the drawings.

Figure 1:
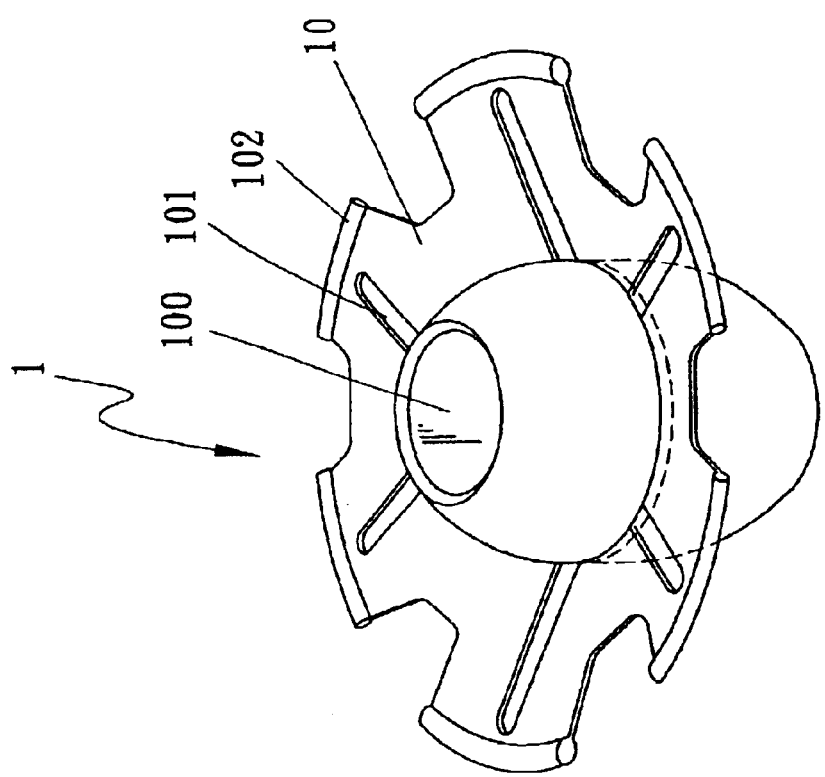
FIG. 1 is a three dimensional view of the invention.
Figure 2:
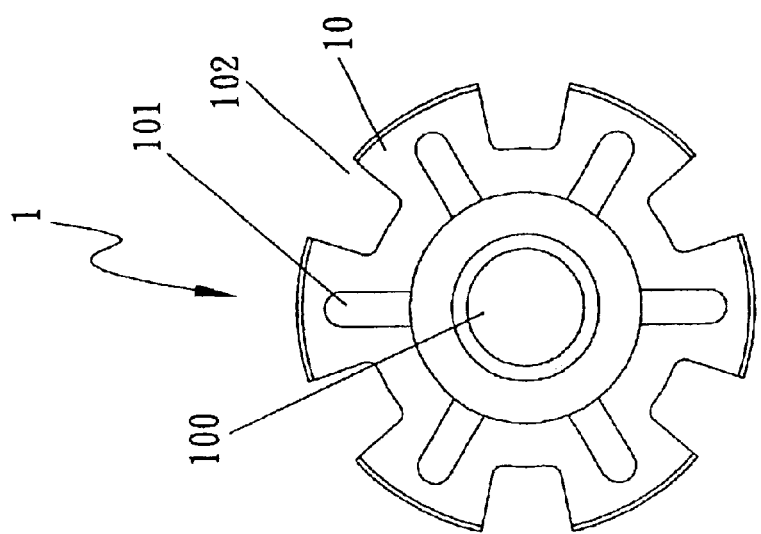
FIG. 2 is a plan view of the invention.

Referring to FIG. 1 and FIG. 2, a plastic hub that its core can be automatically adjusted according to the embodiment of the invention includes a hub main body 1 and a plurality of hub blades 10 formed on the outer portion of the hub main body 1 and distributed like a ring around the hub, wherein an arch-shape cylinder 102 is formed at the end of each hub blades 10 so as to provide an effect of adjusting the position shift.

Figure 3:
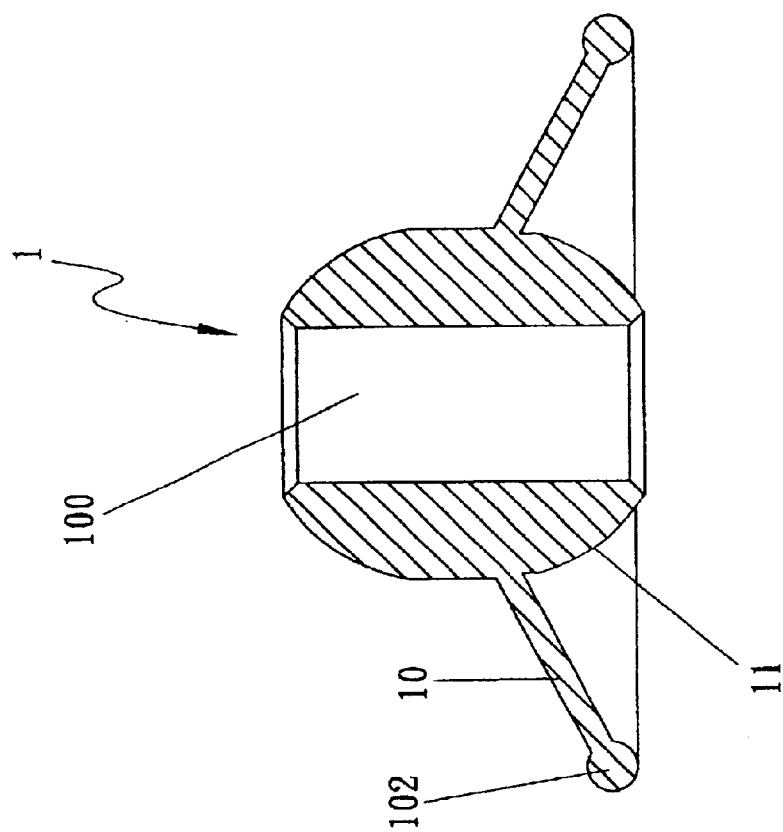
FIG. 3 is a front view of the invention.

As shown in FIG. 3, a hub hole 100 is provided in the center of the hub main body 1, which allows hub axle 2 to penetrate through, and the hub blades 10, which are tilted blades, are formed around the hub axle 2; a blade slot 101 is located on each of the hub blades 10, whereas the arch-shape cylinder 102 is formed at the tail portion of each hub blades 10; a ball construction 11 is located at the inner portion of the hub main body 1, and the ball construction 11 is engaged with the arch-shape concaved slot 31 in the middle of the positioning rack 3.

Figure 4:
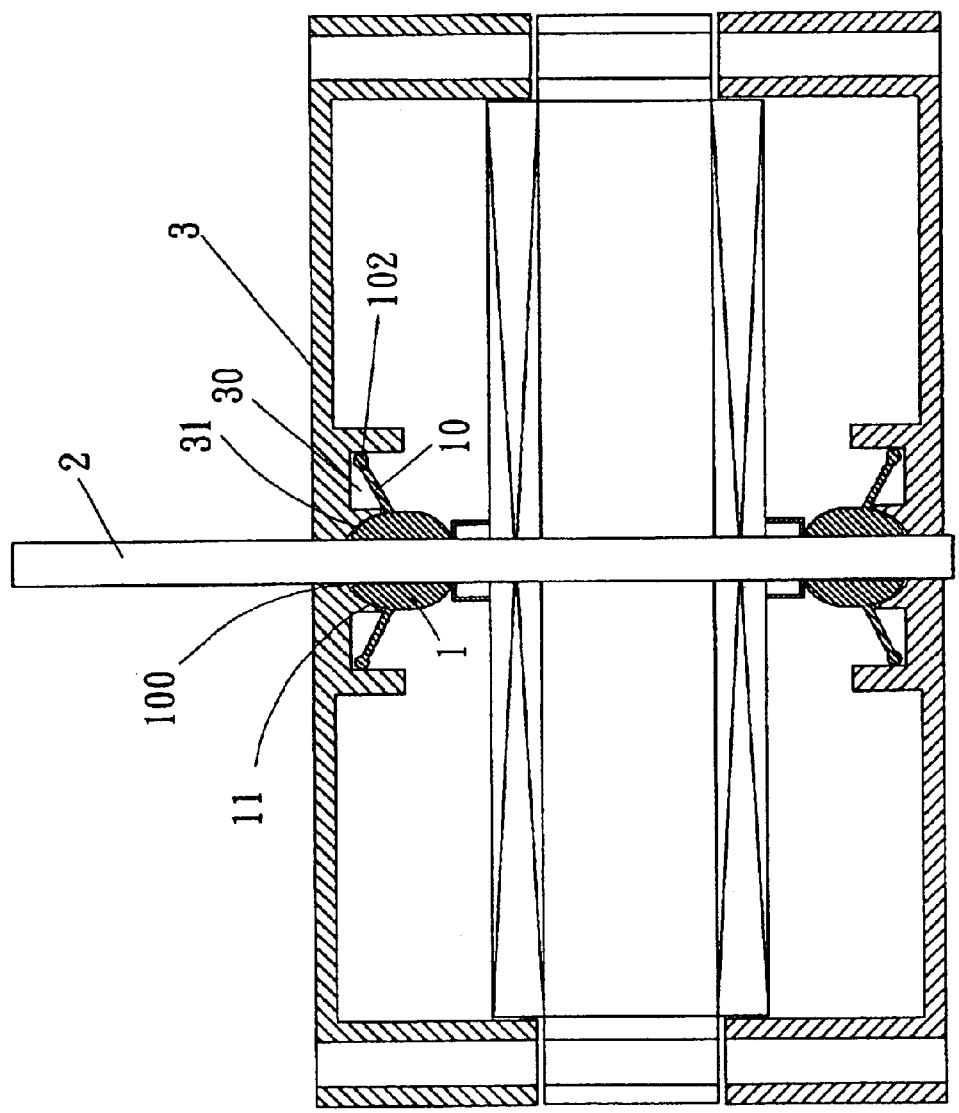
FIG. 4 is a sectional view showing the layout of the axle being put into the hub main body, according to the embodiment of the invention.

As shown in FIG. 4, when the ball construction 11 located at the inner portion of the hub main body 1 is engaged with the arch-shape concaved slot 31 that is located in the middle of the positioning rack 3, each arch-shape cylinder 102 located at the end of each hub blades 10 is placed against the ring-shape concaved slot 30 that is protruded from the positioning rack, and this enables the hub axle 2 to go down into the positioning rack 3 to be adjusted in position shift. At this moment, aside from the hub axle 2 being precisely positioned, the position shift generated by the revolving of the hub axle 2 can also be adjusted by the hub blades 10 as well as the hub core can be automatically adjusted.

Figure 5:
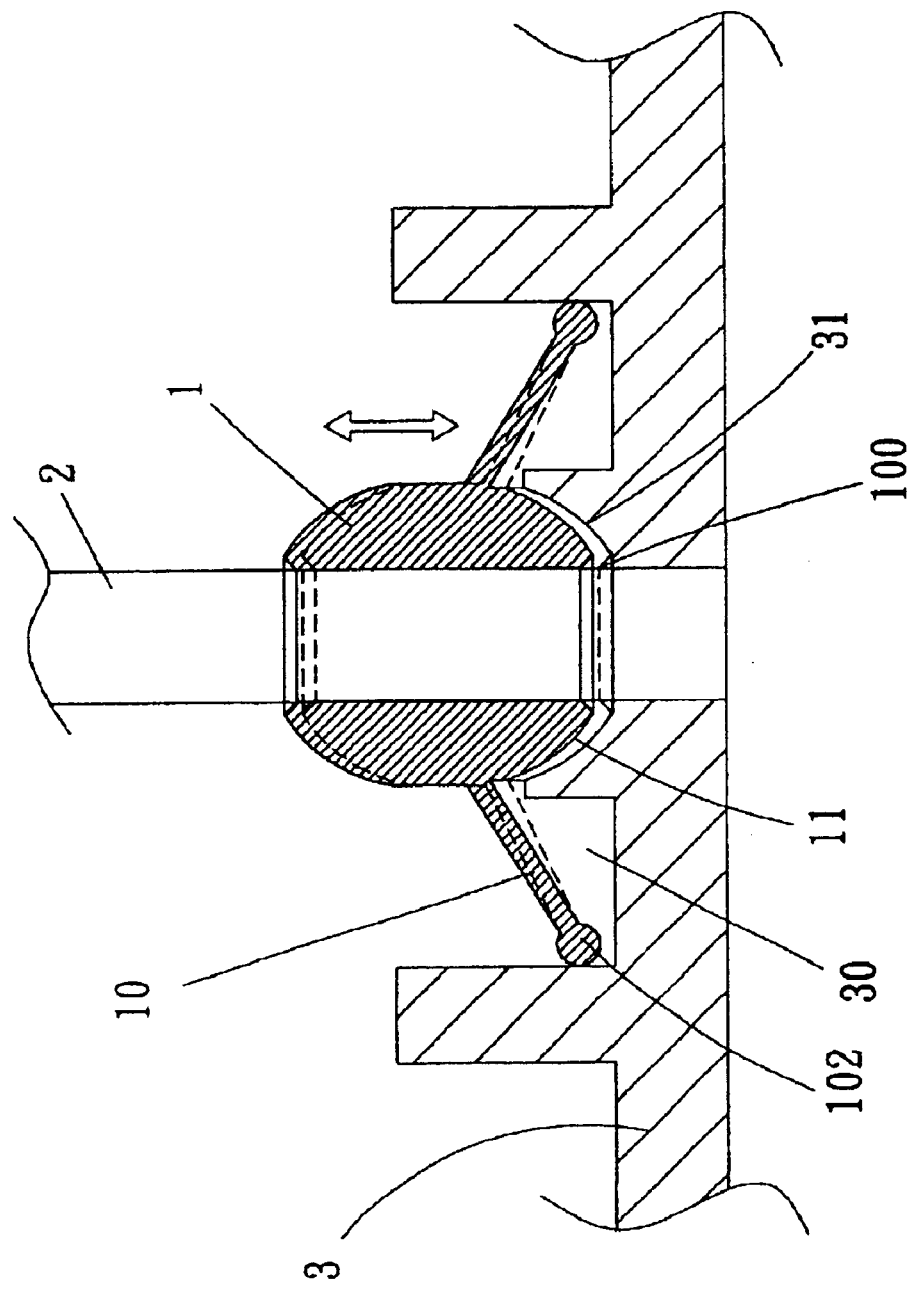
FIG. 5 is a schematic diagram showing the axle is bearing a axial force according to the embodiment of the invention.
Figure 6:
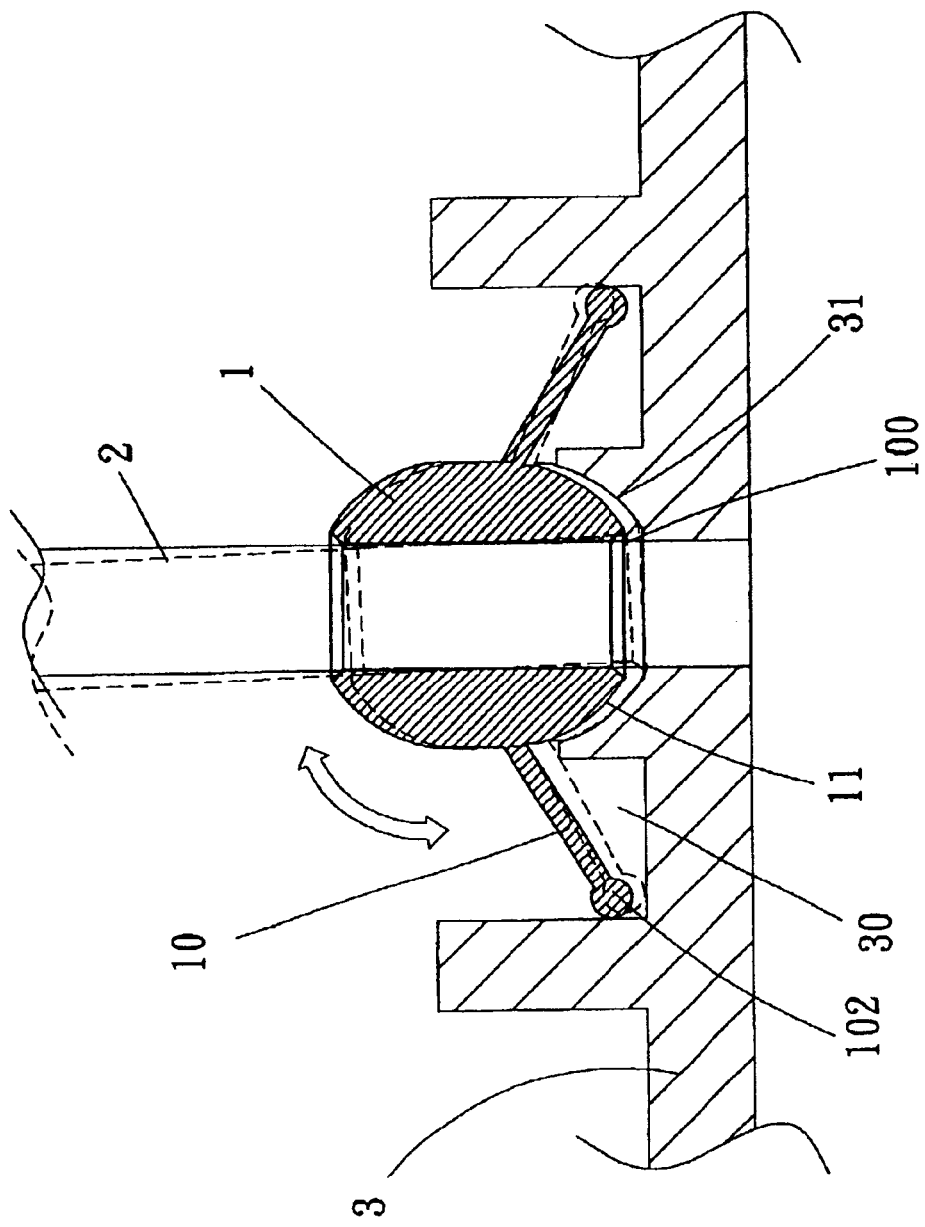
FIG. 6 is a schematic diagram showing the position of the axle is shifted when it is revolving, according to the embodiment of the invention.

When the hub axle 2 is revolving and bearing the axial force, it can accept the external force through the hub blades 10, as shown in FIG. 5. Also, when the hub axle 2 is revolving, the position of its core will be shifted a little bit. At this time, the hub main body 1 can make a slightly revolving shift (as shown in FIG. 6) in the ring-shape concaved slot 30 of the positioning rack 3 through the arch-shape cylinders 102 at the end of the hub blades 10.

To sum up, the invention can indeed automatically adjust the hub core and, through the arch-shape surfaces of the arch-shape cylinders, can provide the effect of adjusting the position shift, which in turn proves that the design of the invention is practical and improved.

What is claimed is:

1. A plastic hub with an automatically adjusted core, including:
   a hub main body;
   a hub hole in the center of the hub main body, for being penetrated by an axle; and
   a plurality of hub blades formed on the outer portion of the hub main body; a blade slot is located on each of the hub blades, and an arch-shape cylinder is formed at the end of each hub blades; the hub main body is placed against a ring-shape concaved slot of a positioning rack by the hub blades, and through the arch-shape surfaces of the arch-shape cylinders, the position shift of the hub core can be adjusted.

2. The plastic hub with an automatically adjusted core as claimed in claim 1, wherein the hub blades are tilted blades.

3. The plastic hub with an automatically adjusted core as claimed in claim 1, wherein the inner portion of the hub main body is a ball construction.

4. The plastic hub with an automatically adjusted core as claimed in claim 1, wherein the hub blades have a shape of wave.

5. The plastic hub with an automatically adjusted core as claimed in claim 1, wherein the front end and the rear end of the hub main body are in the same form.

* * * * *